United States Patent [19]

Davidovitch

[11] Patent Number: 4,544,174

[45] Date of Patent: Oct. 1, 1985

[54] DRIVING MECHANISM FOR VEHICLE PROPELLED BY HUMAN MUSCLE POWER

[76] Inventor: Jecheskel Davidovitch, 22 Avtalion St., Ramath Gan, Israel

[21] Appl. No.: 488,117

[22] Filed: Apr. 25, 1983

[30] Foreign Application Priority Data

May 7, 1982 [IL] Israel ......................................... 65711

[51] Int. Cl.⁴ ........................... B62L 3/04; B62M 1/04
[52] U.S. Cl. ................................. 280/255; 188/24.11; 188/24.12; 188/24.22
[58] Field of Search ............... 280/253, 255, 254, 256, 280/257, 258, 233, 234, 235, 243, 245, 247; 188/24.11, 24.12, 24.22

[56] References Cited

U.S. PATENT DOCUMENTS

| 643,647 | 2/1900 | Harmon | 280/233 |
| 3,759,543 | 9/1973 | Clark | 280/255 |
| 3,913,945 | 10/1975 | Clark | 280/255 |
| 4,178,807 | 12/1979 | Young | 280/255 |

FOREIGN PATENT DOCUMENTS

| 87324 | 11/1920 | Switzerland | 280/255 |
| 635 | of 1890 | United Kingdom | 280/255 |

Primary Examiner—John A. Pekar
Attorney, Agent, or Firm—Toren, McGeady, Stanger, Goldberg & Kiel

[57] ABSTRACT

A driving mechanism for bicycles and like vehicles propelled by human muscle power wherein a reciprocal pull motion at the two ends of a single flexible cord (or any other bendable element), is converted into a one directional rotary motion, the mechanism providing the possibility of obtaining different rotating speeds.

7 Claims, 3 Drawing Figures

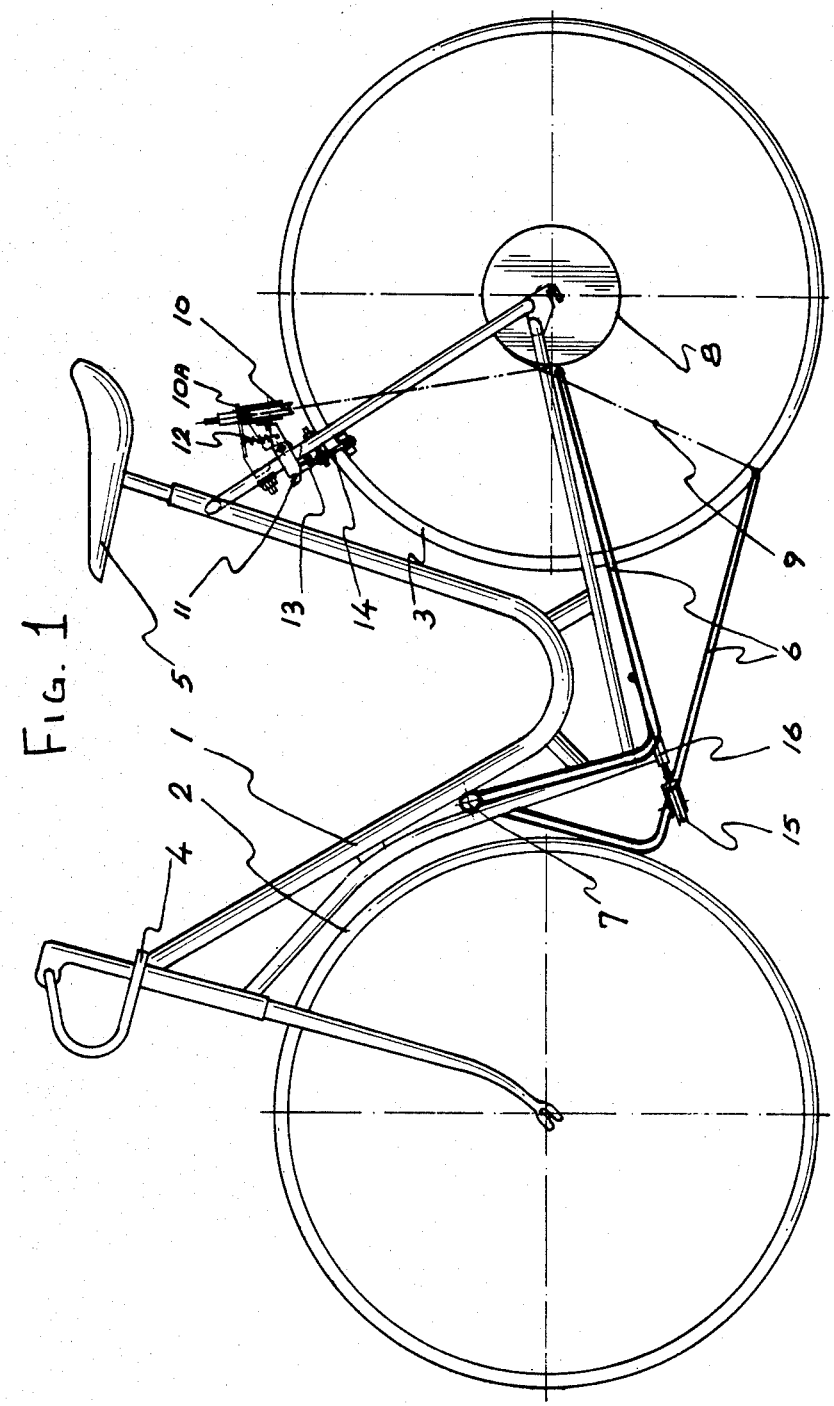

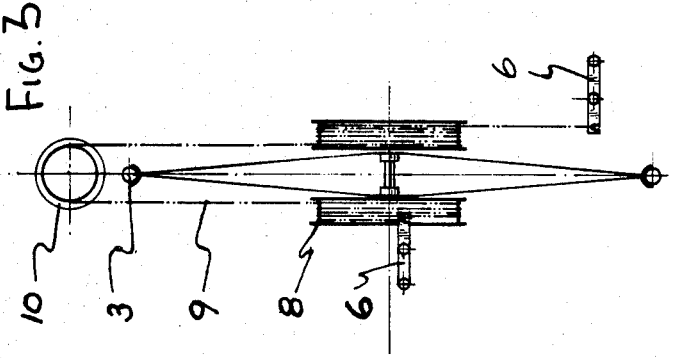
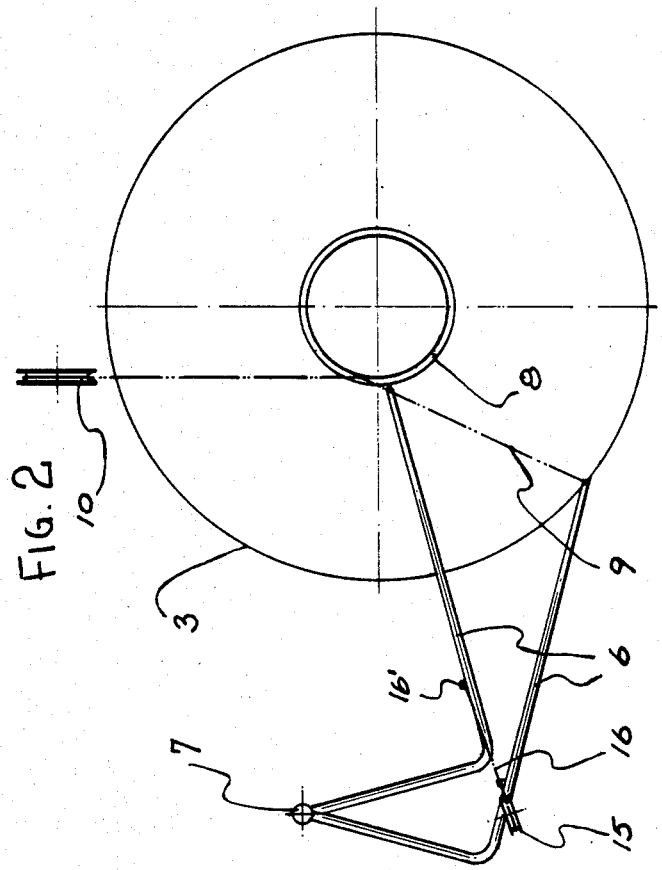

DRIVING MECHANISM FOR VEHICLE PROPELLED BY HUMAN MUSCLE POWER

This invention relates to a driving mechanism for bicycles and like vehicles propelled by human muscle power wherein a reciprocal pull motion at the two ends of a single flexible cord (or any other bendable element), is converted into a one directional rotary motion, the said mechanism providing the possibility of obtaining different rotating speeds.

The invention is particularly but not exclusively concerned with driving mechanism for use with vehicles such as, for example, pedal operated bicycles, tricycles, gymnastical bicycles, handicap vehicles or the like.

It is an object of the present invention to provide a new and simple driving mechanism for such vehicles.

In its broadest aspects, the new driving mechanism comprises a pair of grooved pulleys fixedly and concentrically attached to the driven wheel at opposite sides thereof, said pulleys including a conventional free wheeling mechanism, i.e. driving in the forward direction, and free wheeling rearwards, a driving cord, partially wound around both the grooved pulleys, an intermediate grooved idler being provided around which the driving cord moves alternatingly from one pulley to the other, and two pedals of elongated shape of a length greater than a human foot, both pedals being pivotted at one of their ends, each being connected to one end of the driving cord at its other end.

In such an arrangement alternatingly depressing the two pedals will create a reciprocal movement of the driving cord, and the two groove pulleys about which the driving cord is wound, will thus be caused to rotate oscillatingly by frictional forces in opposite directions relative to one another.

Due to the free wheeling feature of the two grooved pulleys, a one directional rotary motion will be imparted to the driven wheel, the rotating speed of the wheel being determined by the length of stroke of the driving cord, and the frequency of the alternating strokes.

The two pedals form levers, which swing through different angles, when depressed evenly at different distances from the fulcrum of the lever. As the angle through which the pedals swing determines the stroke length of the driving cord, different rotating speeds will accordingly be imparted to the driven wheel, at same actuating frequencies.

In other words, there is a possibility of obtaining different rotating speeds, merely by change of the location where the rider's foot depresses the pedal, without changing the length of foot movement and frequencies.

It is obvious that greater speeds under same circumstances require investment of more power and vice versa. Thus, desired speeds and corresponding power requirements can be regulated to the convenience and choice of the rider.

In a practical embodiment of the invention, two grooved pulleys are mounted oppositely on both sides of a bicycle's rear wheel, the grooved intermediate idler is mounted at the back portion of the bicycle's frame, and the pivotting points of the two actuating pedals i.e. the fulcrums of the levers on the front portion of the frame.

The driving cord is slung about the intermediate idler, then is led to the two grooved pulleys around which the cord is wound on each pulley in an opposite direction (clockwise and anti clockwise), whereupon the two ends of the cord are attached to the two free ends of the pedals.

When the two pedals are depressed alternatingly, the reciprocal motion of the cord is transferred by frictional forces to the two grooved pulleys, which will therefore rotate oscillatingly in opposite directions relative to one another.

Due to the free wheeling feature of the grooved pulleys, a one directional rotary motion will be obtained at the rear wheel, driving the bicycle forwards.

Another feature which can be introduced in this bicycle as part of the present invention, is a brake system which is operated when both pedals are depressed simultaneously.

The braking action is achieved by means of the intermediate idler being carried on a swingable arm, which is spring loaded against an adjustable stop, and connected to brake shoes of conventional design acting on the rim of the wheel.

When both pedals are depressed, the driving cord pulls downwardly the intermediate idler, causing the said arm to swivel against the biasing spring and consequently operating the brake mechanism.

It is assumed that the act of stretching out both legs, coincides with the natural reaction of the rider to a sudden danger. Thus reflexes of the human body are utilised for emergency brake operations, increasing the safety margin while riding this bicycle.

Another arrangement can be introduced in the driving mechanism according to the present invention for ensuring a positive and constant tension of the driving cord. This tension is required for preventing occasional slackness of the driving cord, due to fluctuations of tilting movements, thus avoiding its dropping off the grooved rollers. The tension is also intended for ensuring sufficient frictional forces between the two grooved driving pulleys, and the driving cord.

The tension of the driving cord would otherwise be maintained only partially, by self weight of the two pedals, and the actuating forces.

The said arrangement comprises a tensioning grooved roller attached to the bottom of the frame, and a separate tensioning cord (or another bendable element), the two ends of which are connected each to one pedal, the said cord extending around the said roller. The tensioning cord forms together with the driving cord a closed circle, and being adjustable in length, the tensioning cord permits to determine the circumference of the said closed circle, and thus create the required tension in the driving cord.

These and further features of the invention will become clear from the following detailed description, which has references to the annexed drawings, in which:

FIG. 1 is a schematic side elevation of a bicycle provided with the new driving mechanism.

FIG. 2 is a schematic side and

FIG. 3 a front elevation of the driving mechanism only.

As seen in FIG. 1, a bicycle provided with a driving mechanism in accordance with the present invention, comprises basically a frame 1, front and rear wheels 2 and 3, handle bars 4, an adjustable seat 5, a pair of elongated pedals 6 swingable about a pivot 7 which is fixed in frame 1, a pair of grooved pulleys 8 which include a backwards free wheeling device of conventional design and are mounted cocentrically on both sides of the rear wheel 3 and are fixedly connected therewith. There is further provided a driving cord 9, an intermediate grooved idler 10 which is mounted on a swingable arm 11, a tension spring 12 which is attached to arm 11 and to frame 1, an adjustable stop 13 which limits the swivelling movement of arm 11 against the pull of spring 12, a conventional brake mechanism 14 which is mounted on frame 1 and connected with arm 11, a tensioning roller 15 which is mounted on frame 1 and a tensioning cord 16 which is connected to pedals 6, and surrounds roller 15.

Items 1 to 5 and 14 do not form part of the present invention, and may be of any conventional design and build.

Turning now to FIGS. 2 and 3, the driving cord 9 which is slung about the intermediate idler 10, reaches the grooved pulleys 8, around which the cord is wound and therefrom is led to the two free ends of the pedals 6. The tensioning cord 16 extends around tensioning roller 15 and is connected at both of its ends to each of the pedals 6 at 16'.

The driving mechanism operates as follows:

The pedals 6 are depressed alternatingly and the driving cord 9 is consequently pulled by the pedals back and forth, in a reciprocal motion. This motion is transferred by frictional forces to the two grooved pulleys 8, which will therefore rotate oscillatingly in opposite directions to one another.

The pulleys 8, being free wheeling rearwardly, will apply a one directional forward rotation to rear wheel 3, thus causing the bicycle to advance.

Depressing pedals 6 at different distances from pivot 7, while maintaining even foot strokes, will result in different swinging angles of the pedals.

Obviously the said different swinging angles, will determine the stroke length of the driving cord 9 and consequently the rotating speed of rear wheel 3.

This feature enables the control of speeds and power requirements, to the convenience and desire of the rider.

By depressing simultaneously both pedals 6, driving cord 9 will be centrally pulled down, and act upon the intermediate roller 10, thus causing arm 11 to swivel against the bias of spring 12, and operate the brake mechanism.

The tensioning cord 16 is held around tensioning roller 15, while the two ends of the cord which are connected each to one pedal, follow the up and down motion of pedals 6.

By adjusting the length of cord 16, a tension can be applied to it, which will be transferred by the pedals to driving cord 9.

Thus free fluctuation of pedals 6, and slackness of driving cord 9 can be avoided.

While the new drive has been described and shown in the drawing as applied to a bicycle for a single rider, the underlying principle could be applied to a tandem bicycle, in which case the two pedals—long enough to be easily trodden on by both riders positioned one behind the other—would each be carried on two levers which are pivotally connected to the two ends of each pedal and form a parallelogram therewith.

What is claimed is:

1. In a vehicle of the kind propelled by human muscle power and which comprises a frame and a driven wheel mounted on said frame, a driving mechanism including two backwardly free wheeling grooved pulleys which are concentrically fixed on the two sides of said driven wheel, an intermediate grooved idler, mounted on said frame, a single driving cord (or any other bendable element) slung about the said intermediate idler and partially wound around said grooved pulleys, two swingable elongated pedals of a length greater than a human foot to which pedals the two ends of said driving cord are connected, and a brake system which is actuated when said both pedals are depressed simultaneously, and which operates by means of the said intermediate idler being attached to a spring loaded swingable arm, which is connected with a brake mechanism.

2. Wheeled apparatus comprising a frame having a first end portion and a second end portion and a pair of opposite sides extending in the first end portion-second end portion direction, a driven wheel mounted on the second end portion of said frame and having a pair of opposite sides, said driven wheel being arranged to rotate in the forward direction and the rearward direction, means mounted on said frame for driving said driven wheel, said means comprises a pair of operating members elongated in the first end portion-second end portion direction of said frame and each said operating member having a first end and a second end, the first end of each said operating member being pivotally mounted to said frame at the first end portion thereof and extending toward the second end portion, a pair of rotary elements mounted coaxially with said driven wheel each located on one of the opposite sides of said wheel, said rotary elements being coupled to rotate with said driven wheel in the forward direction thereof and to freewheel in the rearward direction thereof, and an elongated flexible drive member having a first end and a second end and being connected at the first end thereof to one of said operating members at a location spaced in the elongated direction of the one of said operating members from the first end thereof and at the second end thereof to the other one of said operating members at a location spaced in the elongated direction of the other one of said operating members from the first end thereof, and intermediate said first and second ends said flexible drive member is in driving engagement with said rotary elements, said operating member being arranged to be operated by a user by contacting said operating members at different positions spaced between the first end thereof and the connection thereof to said flexible drive member whereby the distance between the first end of said operating member and the point of contact by the user determines the speed and power applied to said driven wheel via said flexible drive member.

3. Wheeled apparatus, as set forth in claim 2, wherein the first and second ends of said flexible drive member are connected to the second ends of said operating members.

4. Wheeled apparatus, as set forth in claim 2 or 3, wherein an idling rotary element is positioned on the second end portion of said frame in spaced relation to said driven member and said flexible drive member is in engagement with said idling rotary member intermediate the locations of driving engagement of said flexible drive member with said rotary elements.

5. Wheeled apparatus according to claim 2 or 3 including a braking mechanism and said braking mechanism comprises said operating members when said operating members are depressed similtaneously.

6. Wheeled apparatus according to claim 5, wherein means for supporting said idling rotary element on said frame at a location thereon spaced upwardly from said driven wheel, said means including a swingable arm mounting said idling rotary element, a tension spring secured to said swingable arm and to said frame, and an adjustable stop for limiting the swingable movement of said arm against the pull of said spring.

7. Wheeled apparatus according to claim 3, wherein means are arranged for tensioning said flexible drive element, said tensioning means comprises a separate tensioning cord, a tensioning roller mounted on said frame adjacent the first ends of said operating members, said tensioning cord having a pair of opposite ends with one of said ends connected to one of said operating members and the other said end connected to the other operating member and extending around said tensioning roller.

* * * * *